US009134946B2

(12) United States Patent
Liu

(10) Patent No.: US 9,134,946 B2
(45) Date of Patent: Sep. 15, 2015

(54) ELECTRONIC APPARATUS AND METHOD FOR DATA TRANSMISSION FROM AN ELECTRONIC APPARATUS TO A DISPLAY DEVICE

(75) Inventor: Jin-Yun Liu, Shanghai (CN)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 605 days.

(21) Appl. No.: 13/550,629

(22) Filed: Jul. 17, 2012

(65) Prior Publication Data
US 2013/0300755 A1 Nov. 14, 2013

(30) Foreign Application Priority Data
May 10, 2012 (CN) .......................... 2012 1 0144153

(51) Int. Cl.
*G06F 3/14* (2006.01)
*G06K 9/68* (2006.01)
*G06F 13/36* (2006.01)
*G09G 5/00* (2006.01)

(52) U.S. Cl.
CPC *G06F 3/14* (2013.01); *G06F 13/36* (2013.01); *G06K 9/68* (2013.01); *G09G 5/006* (2013.01); *G09G 2340/12* (2013.01); *G09G 2350/00* (2013.01); *G09G 2360/18* (2013.01); *G09G 2370/10* (2013.01)

(58) Field of Classification Search
None
See application file for complete search history.

(56) References Cited

U.S. PATENT DOCUMENTS

| 5,526,440 | A  | * | 6/1996 | Sakano et al. | 382/202 |
| 5,533,204 | A  | * | 7/1996 | Tipley | 710/108 |
| 7,564,995 | B1 | * | 7/2009 | Yaeger et al. | 382/119 |
| 2004/0117538 | A1 | * | 6/2004 | Liu | 710/315 |
| 2008/0097806 | A1 | * | 4/2008 | Hoover et al. | 705/7 |
| 2010/0097398 | A1 |   | 4/2010 | Tsurumi | |
| 2013/0039423 | A1 |   | 2/2013 | Helle et al. | |

FOREIGN PATENT DOCUMENTS

| EP | 1 677 547 | 7/2006 |
| EP | 2 053 863 | 4/2009 |
| EP | 1 742 479 | 9/2009 |

OTHER PUBLICATIONS

English language translation of abstract of TW 200841702 (published Oct. 16, 2008).
English language translation of abstract of TW 200922324 (published May 16, 2009).
English language translation of abstract of TW 201204047 (published Jan. 16, 2012).

* cited by examiner

*Primary Examiner* — Joni Richer
(74) *Attorney, Agent, or Firm* — McClure, Qualey & Rodack, LLP

(57) ABSTRACT

The invention provides an electronic apparatus. In one embodiment, the electronic apparatus is coupled to a display device, and comprises a memory, a data transmission interface, and a control module. The memory comprises a virtual frame buffer for storing data to be transmitted to the display device. The data transmission interface performs data transmission between the electronic apparatus and the display device. The control module stores a current character image corresponding to a current character in the virtual frame buffer when users input the current character to an input device, determines whether a prior image which has not been transmitted to the display device exists in the virtual frame buffer, determines whether the current character image matches the prior image, and combines the prior image with the current character image to obtain a combined image in place of the prior image when the current character image matches the prior image.

20 Claims, 6 Drawing Sheets

ELECTRONIC APPARATUS AND METHOD FOR DATA TRANSMISSION FROM AN ELECTRONIC APPARATUS TO A DISPLAY DEVICE

CROSS REFERENCE TO RELATED APPLICATIONS

This Application claims priority of China Patent Application No. 201210144153.4, filed on May 10, 2012, the entirety of which is incorporated by reference herein.

BACKGROUND OF THE INVENTION

1. Field of the Invention

The invention relates to data communication, and more particularly to communication of image data.

2. Description of the Related Art

Ordinarily, a memory of a host comprises a virtual frame buffer for storing all pixel data to be displayed on a screen. A graphic card corresponding to the screen also comprises a frame buffer for storing all pixel data to be displayed on the screen. When a user of the host inputs a character via a keyboard, because a character image corresponding to the input character must be shown on the screen, the host must first store the character image to the virtual frame buffer of the host, and then transmit the character image from the host to the graphic card to be stored to the frame buffer of the graphic card.

Referring to FIG. 1, a schematic diagram of a virtual frame buffer 110 of a host and a frame buffer 120 of a graphic card is shown. Assume that a character image 112 corresponding to a character input by a user has been stored in the virtual frame buffer 110, wherein the character image has a width of w pixels and a height of h pixels, and a pixel on an upper-left corner of the character image 112 has an address PV0 in the virtual frame buffer 110. To show the character image 112 input by the user on the screen, the host must transmit the character image 112 to the frame buffer 120 of the graphic card. Referring to FIG. 2, a flowchart of a method 200 for transmitting a character image to a frame buffer of a display device is shown.

First, a user inputs a character to an input device (such as a keyboard) of a host (step 202). The host then stores a character image 112 corresponding to the character to a virtual frame buffer 110 of the host (step 204). Because the character image has a height of h pixels, the host divides the character image into h rows of pixels, and each row comprises w pixels (step 206). The host then transmits a first row of pixels of the character image to the display device to be stored in the frame buffer 120 with a starting address of offset0 (step 211). Assume that the width of the screen is pitch. The host then transmits a second row of pixels of the character image to the display device to be stored in the frame buffer 120 with a starting address of (offset0+pitch) (step 212). Each row of pixels of the character image is then respectively transmitted to the frame buffer of the display device, until an h-th row of pixels of the character image is transmitted to the display device to be stored in the frame buffer 120 with a starting address of (offset0+(h−1)×pitch) (step 21h).

The aforementioned data transmission method has deficiencies. Because each data transmission must transmit a plurality of protocol packets comprising sync packets, command packets, and frame packets according to a USB protocol, when the frequencies of data transmission is greater, the data amount of the protocol packets to be transmitted is greater, and the data processing load of the host is heavier. For example, when a character image is divided into a plurality of rows of pixels to be transmitted to the frame buffer, the efficiency of data transmission is lowered due to the protocol packets to be transmitted. In addition, when a user inputs a character, the host directly transmits the character image to the display device. If the user continuously inputs a series of characters, the host transmits the characters to the display device, and the efficiency of data transmission is further reduced. In addition, each USB data transmission must initiate software and hardware on transmission terminals and receiving terminals, and a delay is therefore caused. Thus, a method for transmitting data from an electronic apparatus to a display device is therefore required to improve the efficiency of data transmission.

BRIEF SUMMARY OF THE INVENTION

The invention provides an electronic apparatus. In one embodiment, the electronic apparatus is coupled to a display device, and comprises a memory, a data transmission interface, and a control module. The memory comprises a virtual frame buffer for storing data to be transmitted to the display device. The data transmission interface performs data transmission between the electronic apparatus and the display device. The control module stores a current character image corresponding to a current character in the virtual frame buffer when a user inputs the current character to an input device, determines whether a prior image which has not been transmitted to the display device exists in the virtual frame buffer, determines whether the current character image matches the prior image, and combines the prior image with the current character image to obtain a combined image in place of the prior image when the current character image matches the prior image.

The invention also provides a method for data transmission from an electronic apparatus to a display device. First, when a user inputs a current character to an input device, a current character image corresponding to the current character is stored in a virtual frame buffer. Whether a prior image which has not been transmitted to the display device exists in the virtual frame buffer is then determined. Whether the current character image matches the prior image is then determined. When the current character image matches the prior image, the prior image is combined with the current character image to obtain a combined image in place of the prior image.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
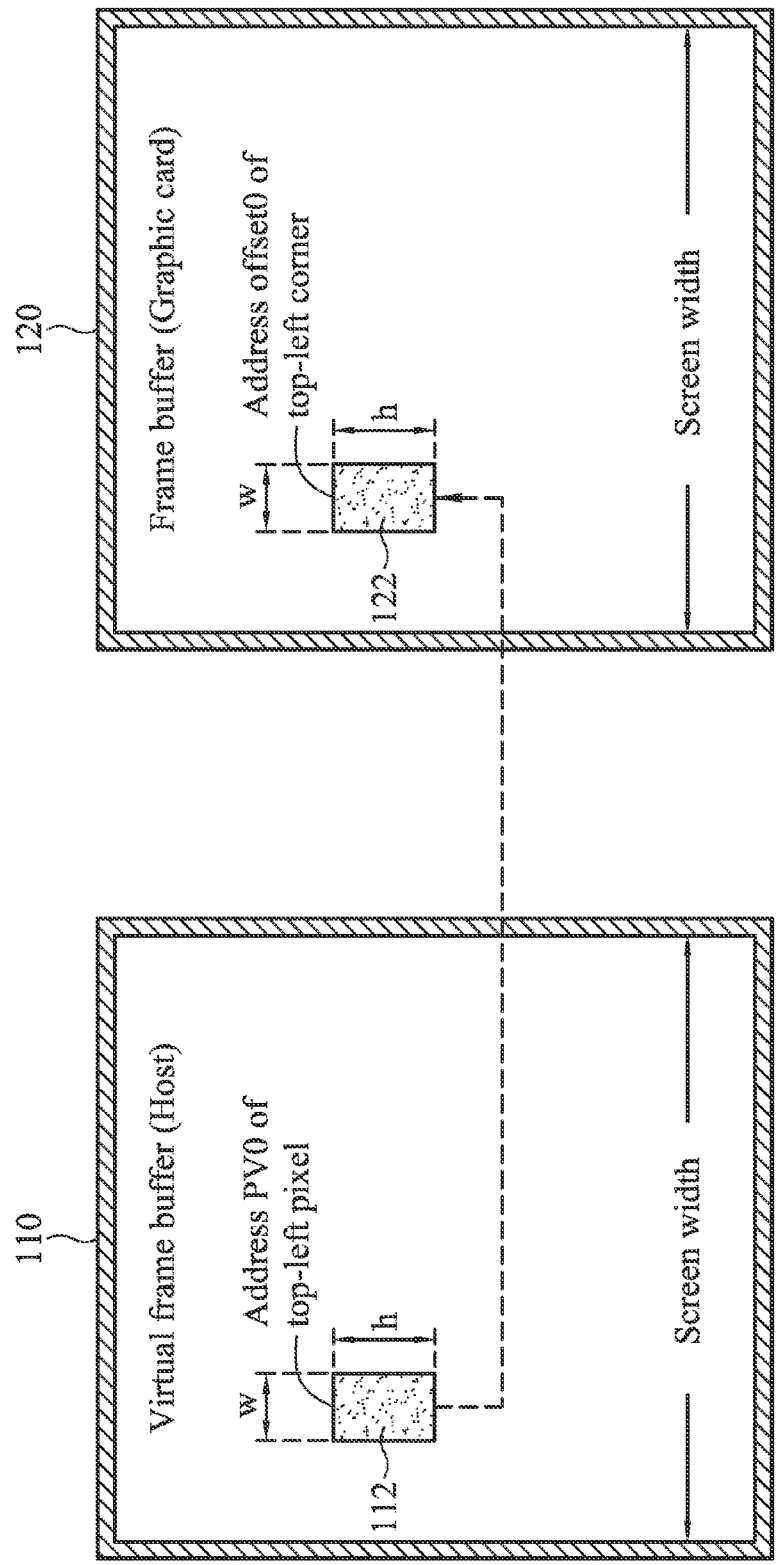
FIG. 1 is a schematic diagram of a virtual frame buffer of a host and a frame buffer of a graphic card.
Figure 2:
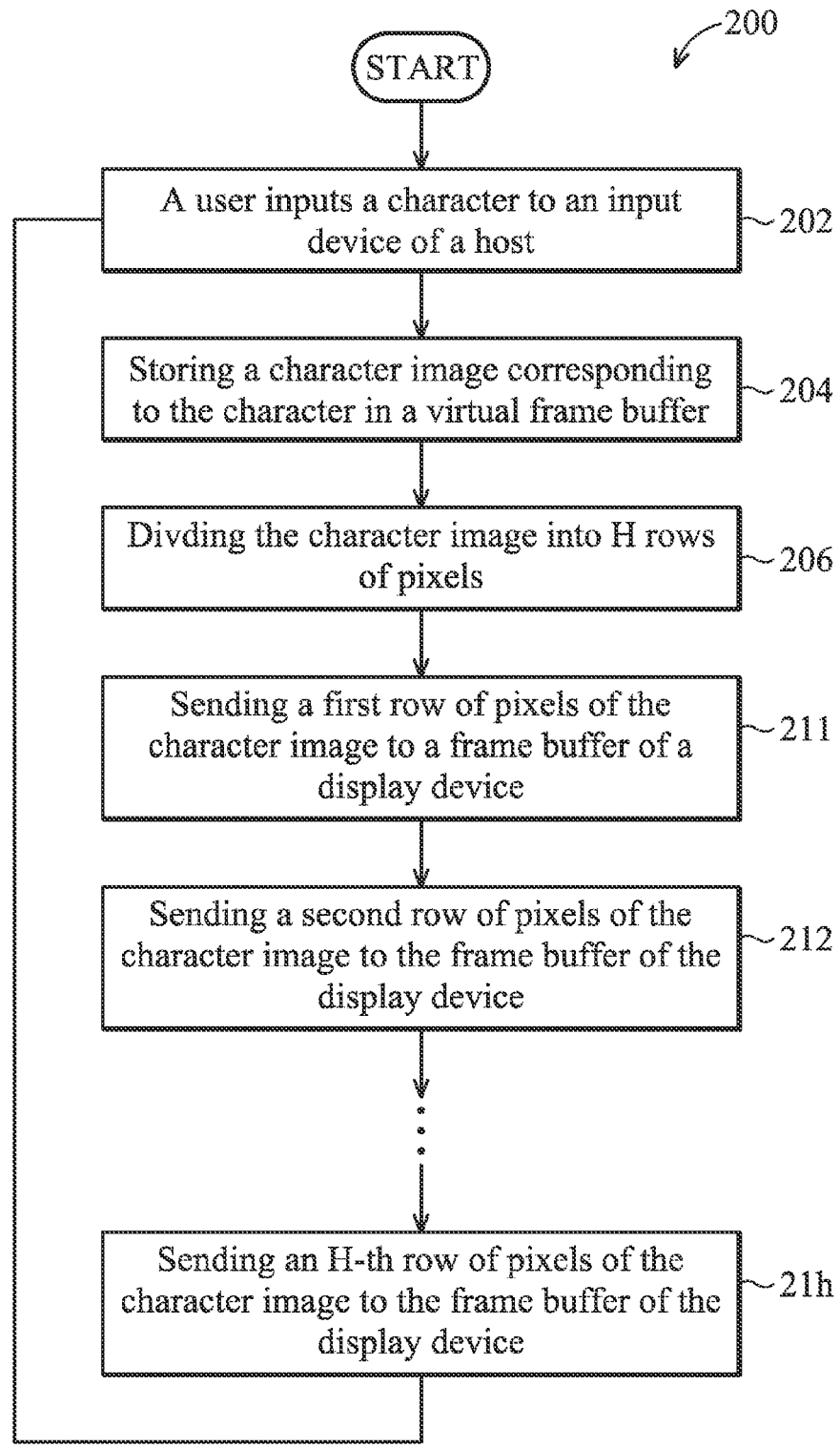
FIG. 2 is a flowchart of a method for transmitting a character image to a frame buffer of a display device.
Figure 3:
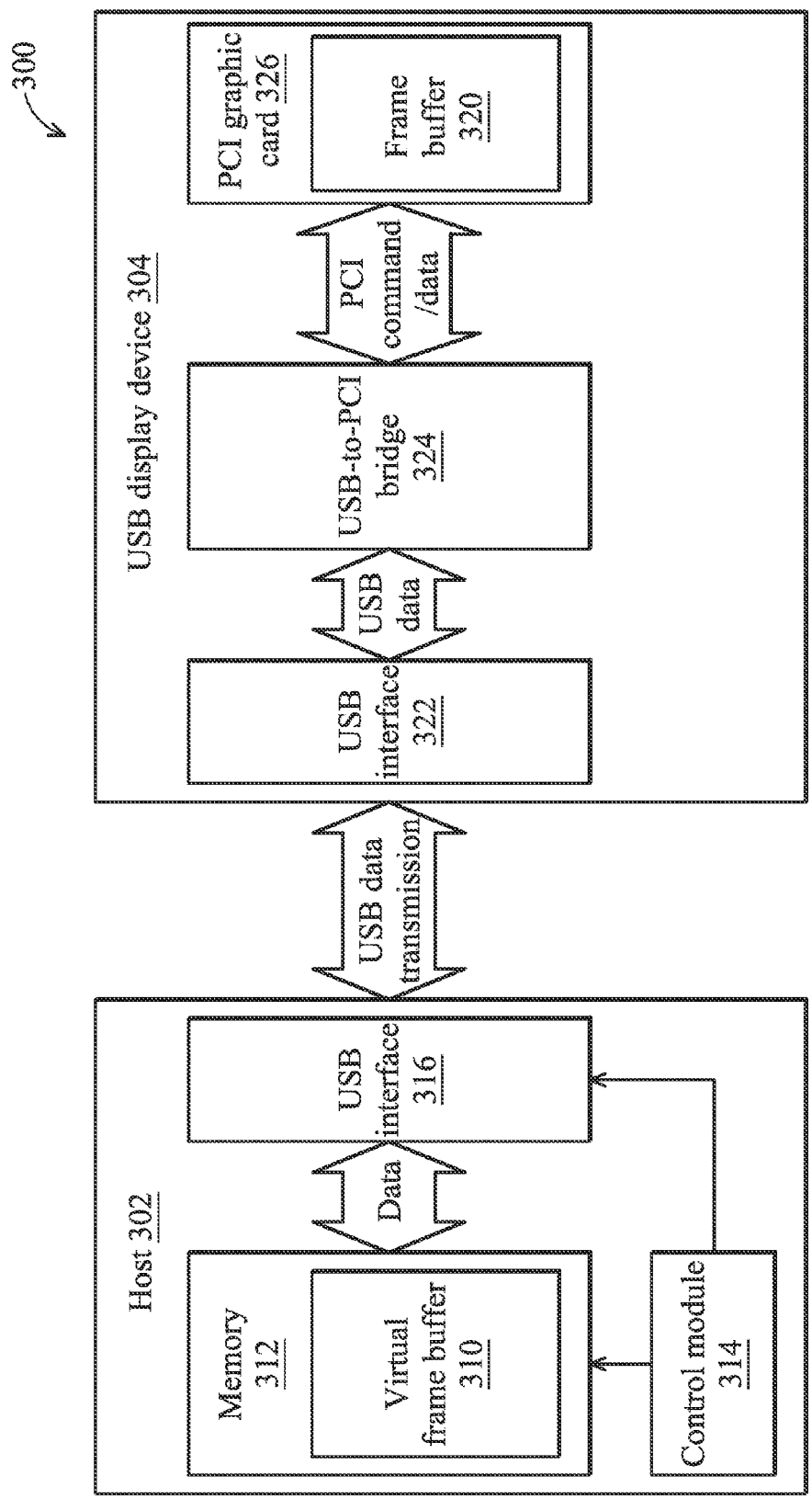
FIG. 3 is a block diagram of a host and a USB display device according to the invention.

Referring to FIG. 3, a block diagram of a host 302 and a USB display device 304 according to the invention is shown. In one embodiment, data transmission between the host 302 and the USB display device 304 progresses according to a universal serial bus (USB) protocol. In one embodiment, the host 302 comprises a memory 312, a control module 314, a USB interface 316, and an input device (not shown). The memory 312 comprises a virtual frame buffer for storing data to be transmitted to the USB display device 304. The USB interface 316 transmits data to the USB display device 304 according to a USB protocol. The control module 314 controls the USB interface 316 to transmit data stored in the virtual frame buffer 310 to the USB display device 304. In one embodiment, the control module 314 is a processor of the host 302 which executes a program code under an operating system. The input device receives characters input by a user of the host 302.

In one embodiment, the USB display device 304 comprises a USB interface 322, a USB-to-PCI bridge 324, and a PCI graphic card 326. The USB interface 322 receives USB data from the host 302 according to a USB protocol. The USB-to-PCI bridge 324 then converts the USB data from the USB format to a PCI format according to a peripheral component interconnect (PCI) protocol. Finally, the PCI graphic card 326 receives data from the USB-to-PCI bridge 324 and then stores the data to a frame buffer 320.

When a user inputs a current character to the input device, the control module 314 does not directly sends a current character image corresponding to the current character to the display device 304. The control module 314 keeps the current character image in the virtual frame buffer 310 during a delay period (such as 5 ms). During the delay period, if the user continues to input a plurality of subsequent characters, and the location of the subsequent characters are connected to the location of the current character on the screen, the control module 314 combines the current character image with the images of the subsequent characters to obtain a combined image. After the delay period is passed, the control module 314 transmits the combined image to the USB display device 304. The data amount of protocol packets to be also transmitted is therefore reduced, and the efficiency of data transmission is therefore improved.

Figure 4:
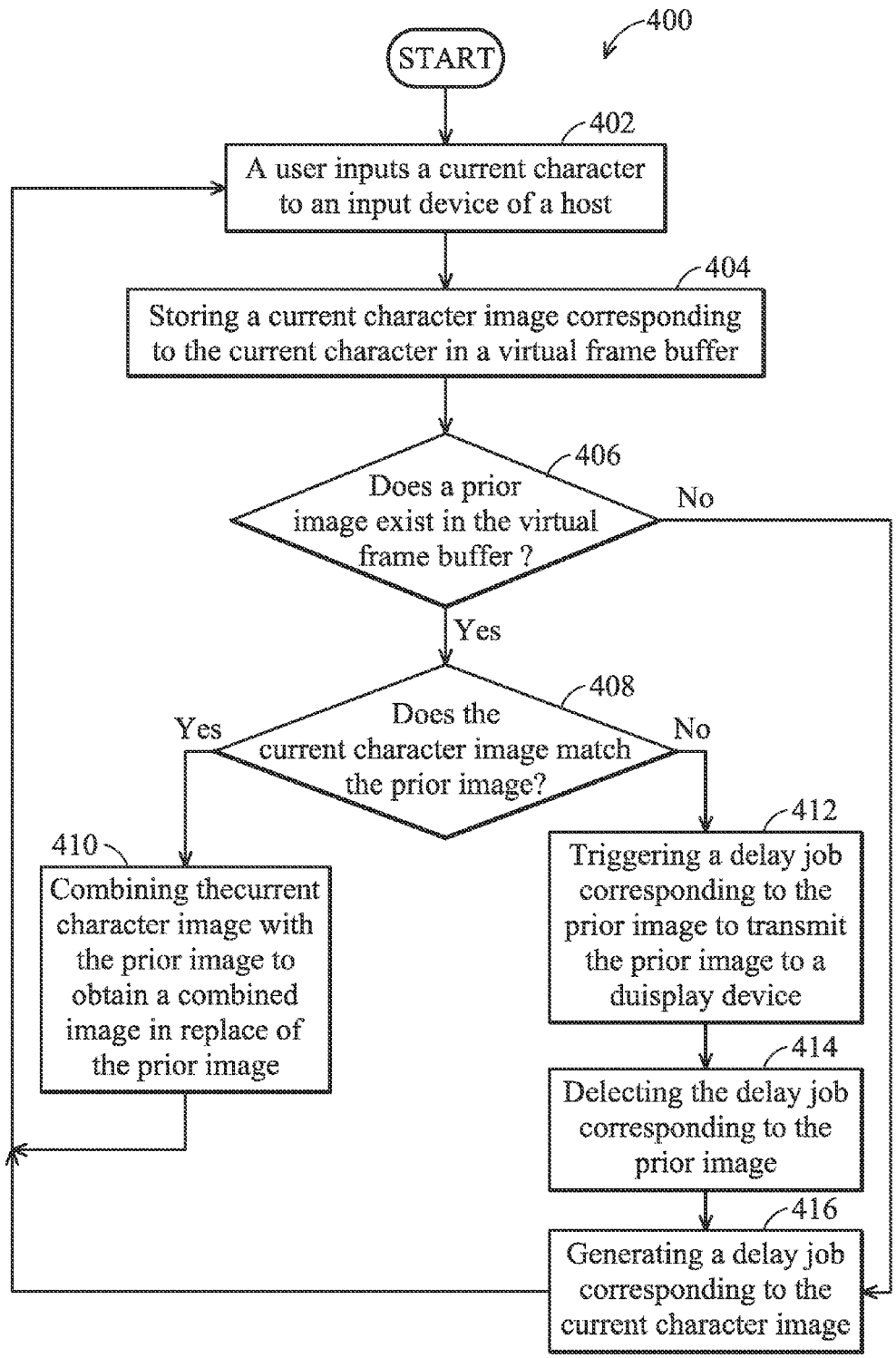
FIG. 4 is a flowchart of a method for transmitting image data from a host to a USB display device according to the invention.

Referring to FIG. 4, a flowchart of a method 400 for transmitting image data from the host 302 to the USB display device 304 according to the invention is shown. First, a user inputs a current character to an input device of the host 302 (step 402). The control module 314 then stores a current character image corresponding to the current character to a virtual frame buffer 310 (step 404). The control module 314 then determines whether a prior image which has not been transmitted to the USB display device 304 exists in the virtual frame buffer 310 (step 406). If the prior image does not exist in the virtual frame buffer 310, the control module 314 generates a delay job corresponding to the current character image (step 416). The content of the delay job is to transmit the current character image to the USB display device 304 after a delay period (5 ms) has passed. The detailed steps of the delay job are further illustrated in FIG. 5.

If the prior image exists in the virtual frame buffer 310 (step 406), the control module 314 further determines whether the prior image matches the current character image (step 408). If the boundary of the current character image is next to the boundary of the prior image, the current character image is determined to match the prior image. In one embodiment, when the abscissa value of the upper-left corner of the current character image is equal to a sum of the abscissa value of the upper-left corner of the prior image and the width of the prior image, the ordinate value of the upper-left corner of the prior image is equal to the ordinate value of the upper-left corner of the current character image, and the height of the prior image is equal to the height of the current character image, the control module determines that the current character image matches the prior image. If the prior image matches the current character image (step 408), the control module 314 combines the prior image with the current character image to obtain a combined image in place of the prior image (step 410). Because the current character image is combined with the prior image, after the delay period corresponding to the prior image has passed, the host 302 then sends the combined image comprising the current character image and the prior image to the USB display device 304.

If the prior image does not match the current character image (step 408), the boundary of the prior image is not next to the boundary of the current character image, and the current character image cannot be combined with the prior image. The control module 314 then directly triggers the delay job corresponding to the prior image to transmit the prior image to the USB display device 304 (step 412). Because the prior image has been transmitted to the USB display device 304, the control module 314 therefore deletes the delay job corresponding to the prior image (step 414). The control module 314 then generates a delay job corresponding to the current character image (step 416). In other words, the control module 314 transmits the current character image to the USB display device 304 after the delay period (5 ms) has passed. If the user inputs a new character (step 402), the current character image becomes a prior image corresponding to the new character (step 406), and the control module 314 continues to determine whether the image of the new character can be combined with the prior image (step 408).

Figure 5:
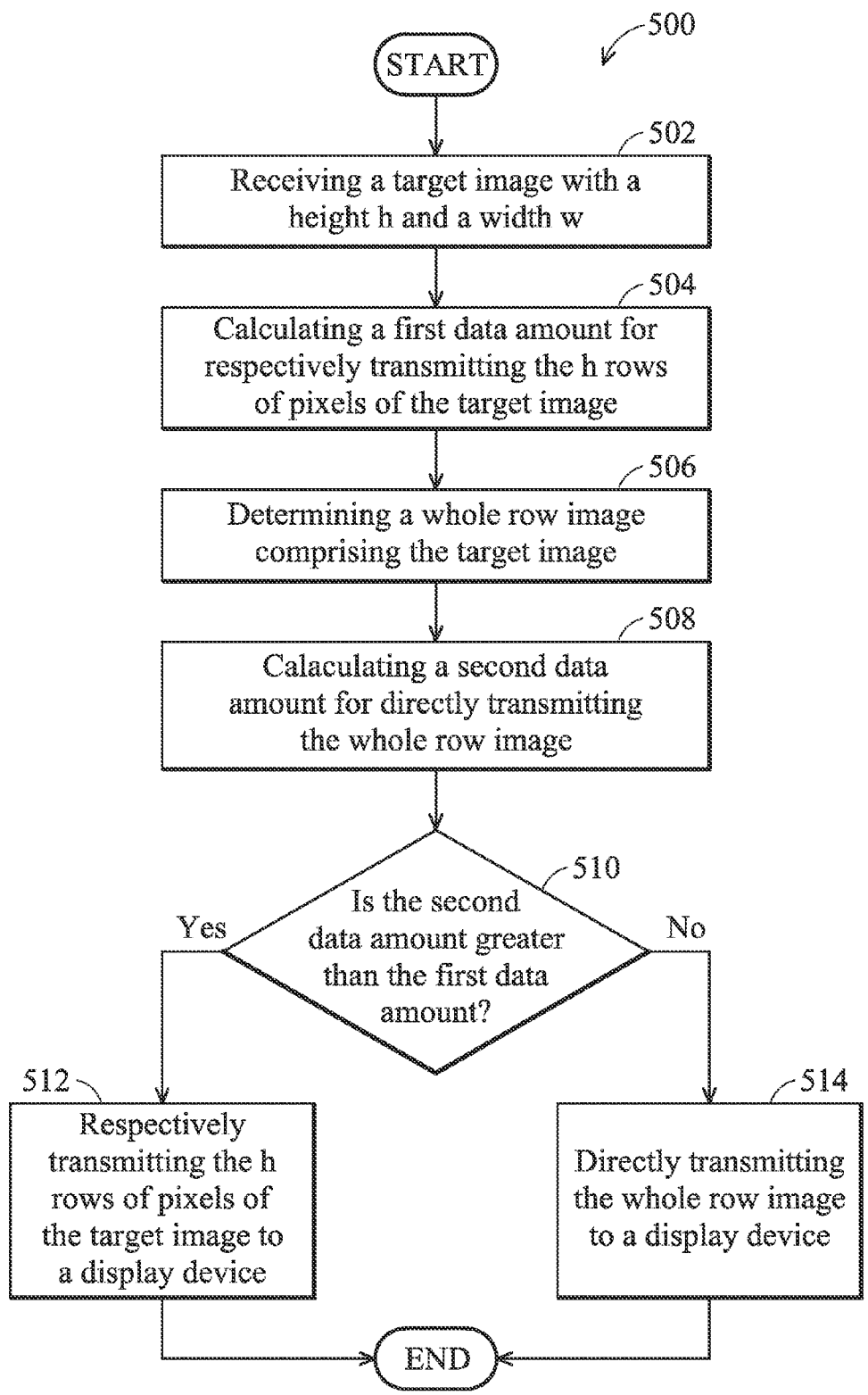
FIG. 5 is a flowchart of a method for executing a delay job corresponding to a target image according to the invention.

Referring to FIG. 5, a flowchart of a method 500 for executing a delay job corresponding to a target image according to the invention is shown. Assume that the delay job corresponds to the target image having a height of rect.h and a width of rect.w. First, the control module 314 calculates a first data amount for respectively transmitting a plurality of rows of pixels of the target image (step 504). In one embodiment, the first data amount is calculated according to the following equation:

$$Q1 = rect.h \times (rect.w \times bpp + const);$$

wherein Q1 is the first data amount, rect.h is the height of the prior image, rect.w is the width of the prior image, bpp is the number of bits per pixel, and const is the data amount of protocol packets.

The control module 314 then determines a whole row image comprising the prior image (step 506), and calculates a second data amount for transmitting the whole row image (step 508). In one embodiment, the second data amount is calculated according to the following equation:

$$Q2 = rect.h \times pitch \times bpp + const;$$

wherein Q2 is the second data amount, rect.h is the width of the prior image, pitch is the width of the whole row image or a screen, bpp is the number of bits per pixel, and const is the data amount of protocol packets.

The control module 314 then determines whether the second data amount is greater than the first data amount (step 510). If the second data amount is greater than the first data amount, the control module 314 controls the USB interface 315 to respectively transmit h rows of pixels of the target image to the USB display device 304 (step 512). If the first data amount is greater than the second data amount, the control module 314 controls the USB interface 316 to transmit the whole row image comprising the target image to the USB display device 304 (step 514).

Figure 6:
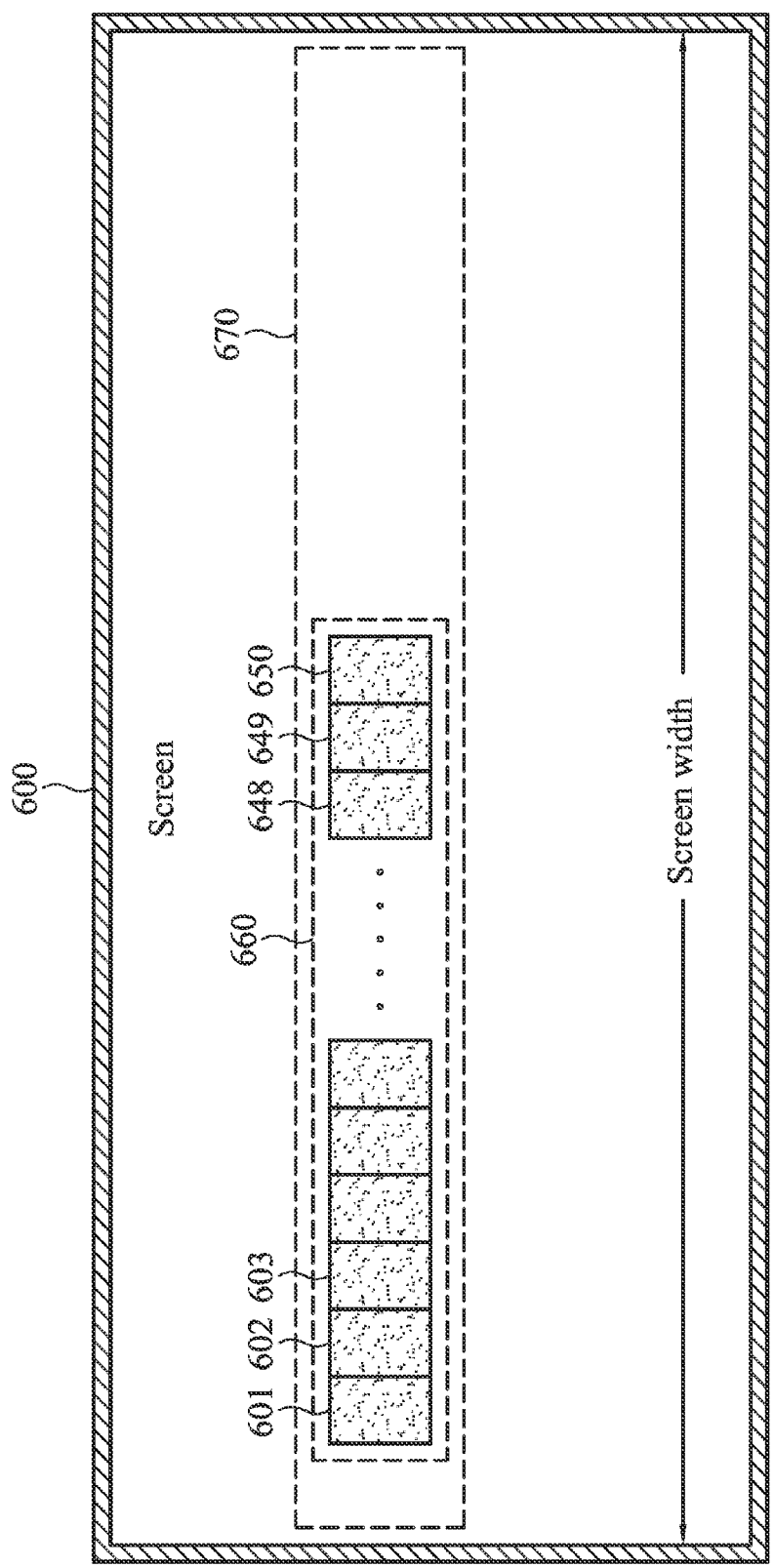
FIG. 6 is a schematic diagram of an embodiment of execution of a delay job for transmitting a target image according to the invention.

Referring to FIG. 6, a schematic diagram of an embodiment of execution of a delay job for transmitting a target image according to the invention is shown. Assume that a user inputs 50 characters during a delay period of 5 ms, and the target image is a combined image 660 comprising 50 character images 601~650 corresponding to the 50 input characters. Execution of the delay job of the combined image 660 is triggered because a delay period has passed. The control module 314 then calculates a first data amount Q1 for respectively transmitting the rows of pixels of the combined image 660 to the USB display device 305, then calculates a second data amount Q2 for transmitting all pixels of a whole row image 670 comprising the combined image 660 to the USB display device 305, and compares the first data amount Q1 with the second data amount Q2 to obtain a comparison result. The control module 314 then respectively transmits the rows of pixels of the combined image 660 to the USB display device 305 or transmits all pixels of the whole row image 670 to the USB display device 305 according to the comparison result.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus, coupled to a display device, comprising:
   a memory, comprising a virtual frame buffer for storing data to be transmitted to the display device;
   a data transmission interface, performing data transmission between the electronic apparatus and the display device; and
   a control module, storing a current character image corresponding to a current character in the virtual frame buffer when a user inputs the current character to an input device, determining whether a prior image which has not been transmitted to the display device exists in the virtual frame buffer, determining whether the current character image matches the prior image, and combining the prior image with the current character image to obtain a combined image in place of the prior image when the current character image matches the prior image, wherein when an abscissa value of the upper-left corner of the current character image is equal to the sum of the abscissa value of the upper-left corner of the prior image and the width of the prior image, the ordinate value of the upper-left corner of the prior image is equal to the ordinate value of the upper-left corner of the current character image, and the height of the prior image is equal to the height of the current character image, the control module determines that the current character image matches the prior image.

2. The electronic apparatus as claimed in claim 1, wherein when the current character image does not match the prior image, the control module triggers execution of a first delay job corresponding to the prior image to transmit the prior image to the display device via the data transmission interface.

3. The electronic apparatus as claimed in claim 2, wherein when the control module completes execution of the first delay job corresponding to the prior image, the control module deletes the first delay job and then generates a second delay job for transmitting the current character image to the display device.

4. The electronic apparatus as claimed in claim 2, wherein execution of the first delay job comprises:
   calculating a first data amount for respectively transmitting a plurality of rows of pixels of the prior image to the display device by the control module;
   calculating a second data amount for transmitting a whole row image comprising the prior image to the display device by the control module;
   when the second data amount is greater than the first data amount, respectively transmitting the rows of pixels of the prior image to the display device via the data transmission interface; and
   when the first data amount is greater than the second data amount, transmitting the whole row image comprising the prior image to the display device via the data transmission interface.

5. The electronic apparatus as claimed in claim 4, wherein the first data amount is calculated according to the following equation:

$$Q1 = \text{rect}.h \times (\text{rect}.w \times bpp + \text{const})$$

wherein Q1 is the first data amount, rect.h is the height of the prior image, rect.w is the width of the prior image, bpp is the number of bits per pixel, and const is the data amount of protocol packets;
and the second data amount is calculated according to the following equation:

$$Q2 = \text{rect}.h \times \text{pitch} \times bpp + \text{const};$$

wherein Q2 is the second data amount, rect.h is the width of the prior image, pitch is the width of the whole row image or a screen, bpp is the number of bits per pixel, and const is the data amount of protocol packets.

6. The electronic apparatus as claimed in claim 2, wherein the display device comprises:
   a universal serial bus (USB) interface, receiving the prior image from the electronic apparatus according to USB protocol;
   a USB-to-PCI bridge, coupled to the USB interface, converting the data of the prior image from a USB format to a peripheral component interconnect (PCI) format; and
   a PCI graphic card, coupled to the USB-to-PCI bridge, storing the prior image to a frame buffer.

7. The electronic apparatus as claimed in claim 1, wherein when the prior image does not exist in the virtual frame buffer, the control module halts transmission of the current character image and generates a second delay job for transmitting the current character image to the display device.

8. The electronic apparatus as claimed in claim 1, wherein the data transmission interface is a universal serial bus (USB) interface, and the electronic apparatus performs data communication with the display device according to USB protocol.

9. The electronic apparatus as claimed in claim 1, wherein the electronic apparatus is a host, and the control module is a processor executing a program code under an operating system.

10. A method for data transmission from an electronic apparatus to a display device, comprising:
when a user inputs a current character to an input device, storing a current character image corresponding to the current character in a virtual frame buffer;
determining whether a prior image which has not been transmitted to the display device exists in the virtual frame buffer;
determining whether the current character image matches the prior image, wherein determination of whether the current character image matches the prior image comprising:
when an abscissa value of the upper-left corner of the current character image is equal to the sum of the abscissa value of the upper-left corner of the prior image and the width of the prior image, the ordinate value of the upper-left corner of the prior image is equal to the ordinate value of the upper-left corner of the current character image, and the height of the prior image is equal to the height of the current character image, determining that the current character image matches the prior image; and
when the current character image matches the prior image, combining the prior image with the current character image to obtain a combined image in place of the prior image.

11. The method as claimed in claim 10, further comprising:
when the current character image does not match the prior image, triggering execution of a first delay job corresponding to the prior image to transmit the prior image to the display device via the data transmission interface.

12. The method as claimed in claim 11, further comprising:
after execution of the first delay job corresponding to the prior image is completed, deleting the first delay job and then generating a second delay job for transmitting the current character image to the display device.

13. The method as claimed in claim 11, wherein execution of the first delay job comprises:
calculating a first data amount for respectively transmitting a plurality of rows of pixels of the prior image to the display device;
calculating a second data amount for transmitting a whole row image comprising the prior image to the display device;
when the second data amount is greater than the first data amount, respectively transmitting the rows of pixels of the prior image to the display device; and
when the first data amount is greater than the second data amount, transmitting the whole row image comprising the prior image to the display device.

14. The method as claimed in claim 13, wherein the first data amount is calculated according to the following equation:

$$Q1 = rect.h \times (rect.w \times bpp + const)$$

wherein Q1 is the first data amount, rect.h is the height of the prior image, rect.w is the width of the prior image, bpp is the number of bits per pixel, and const is the data amount of protocol packets;
and the second data amount is calculated according to the following equation:

$$Q2 = rect.h \times pitch \times bpp + const;$$

wherein Q2 is the second data amount, rect.h is the width of the prior image, pitch is the width of the whole row image or a screen, bpp is the number of bits per pixel, and const is the data amount of protocol packets.

15. The method as claimed in claim 10, further comprising:
when the prior image does not exist in the virtual frame buffer, halting transmission of the current character image and generating a second delay job for transmitting the current character image to the display device.

16. The method as claimed in claim 10, wherein the method further comprises:
when the current data block is full, searching the data blocks of the data block pool for at least one target block with no valid page;
putting the target block to the spare block pool; and
incrementing an erase count of the target block by one.

17. The method as claimed in claim 16, wherein the method further comprises:
after the erase count of the target block is incremented, if the erase count of the target block is greater than a jail threshold, determining the target block to be a jail block and putting the target block to a jail pool.

18. The method as claimed in claim 16, wherein the method further comprises:
after the erase count of the target block is incremented, if the erase count of the target block is greater than a hot threshold, determining the target block as a hot spare block and incrementing the hot spare block number by one.

19. An electronic apparatus, coupled to a display device, comprising:
a memory, comprising a virtual frame buffer for storing data to be transmitted to the display device;
a data transmission interface, performing data transmission between the electronic apparatus and the display device; and
a control module, storing a current character image corresponding to a current character in the virtual frame buffer when a user inputs the current character to an input device, determining whether a prior image which has not been transmitted to the display device exists in the virtual frame buffer, determining whether the current character image matches the prior image, and combining the prior image with the current character image to obtain a combined image in place of the prior image when the current character image matches the prior image, wherein when the current character image does not match the prior image, the control module triggers execution of a first delay job corresponding to the prior image to transmit the prior image to the display device via the data transmission interface, wherein execution of the first delay job comprises:
calculating a first data amount for respectively transmitting a plurality of rows of pixels of the prior image to the display device by the control module;
calculating a second data amount for transmitting a whole row image comprising the prior image to the display device by the control module;
when the second data amount is greater than the first data amount, respectively transmitting the rows of pixels of the prior image to the display device via the data transmission interface; and
when the first data amount is greater than the second data amount, transmitting the whole row image comprising the prior image to the display device via the data transmission interface.

20. A method for data transmission from an electronic apparatus to a display device, comprising:
- when a user inputs a current character to an input device, storing a current character image corresponding to the current character in a virtual frame buffer;
- determining whether a prior image which has not been transmitted to the display device exists in the virtual frame buffer;
- determining whether the current character image matches the prior image;
- when the current character image matches the prior image, combining the prior image with the current character image to obtain a combined image in place of the prior image; and
- when the current character image does not match the prior image, triggering execution of a first delay job corresponding to the prior image to transmit the prior image to the display device via the data transmission interface, wherein execution of the first delay job comprises:
- calculating a first data amount for respectively transmitting a plurality of rows of pixels of the prior image to the display device;
- calculating a second data amount for transmitting a whole row image comprising the prior image to the display device;
- when the second data amount is greater than the first data amount, respectively transmitting the rows of pixels of the prior image to the display device; and
- when the first data amount is greater than the second data amount, transmitting the whole row image comprising the prior image to the display device.

* * * * *